INVENTORS
DONALD D. ARGUE
JOHN D. STAUFFER
BY Vernon F. Kalb
ATTORNEY

INVENTORS
DONALD D. ARGUE
JOHN D. STAUFFER

United States Patent Office 3,183,605
Patented May 18, 1965

3,183,605
APPARATUS FOR COATING METALS
Donald D. Argue and John D. Stauffer, Shelbyville, Ind., assignors to General Electric Company, a corporation of New York
Filed Dec. 27, 1961, Ser. No. 162,446
7 Claims. (Cl. 34—68)

This invention relates to apparatus for the coating of metals and primarily to apparatus for the efficient evaporation of solvents and other volatile components contained in a film-coating material as applied and to the final polymerization or fusing of the coating material. It has particular application to an enameling oven for the curing of film-coated enamel wire and has for its principal object the provision of apparatus for curing coated materials incorporating an improved recirculating gas system including means for closely and accurately controlling the temperature, speed, and direction of the gas flow in a pair of treating zones in the oven independently of each other to increase the capacity of the oven in producing high quality film-coated wire and to minimize fire hazards.

In apparatus now commonly used to coat around and rectangular wires with enamels or resins, it is customary to suspend the coating material in a solvent or dispersing agent so the enamel may be applied evenly to the wire or foil surface. Before the enamel can be polymerized or "baked" to produce the desired electrical and mechanical properties, the dispersing agent or solvent must be removed. Since, as a practical matter, the enamel must be held at an elevated temperature for a period of time to remove these solvents, a portion of the overall length of any wire enameling oven must be devoted to their removal. It is, therefore, advantageous to heat the coated wire so as to obtain the maximum rate of solvent removal as quickly as possible after the entry of the coated wire into the oven so that a greater portion of the total length of the oven may be used for the final curing of the enamel, or the wire may be passed through the oven at a greater rate of speed, thus providing an increase in capacity of the enameling oven.

In removing the solvents or dispersing agents rapidly from a solvent-resin mixture, several problems are encountered. If the solvents are heated rapidly to a temperature above their boiling point, the physical agitation caused by the boiling of the solvents will produce a rough surface on the enameled wire and render it unacceptable for use. Another and usually the most severe problem is the problem of so-called blistered wire. Blistering occurs when the surface layer of the enamel coating is heated rapidly to a temperature where the polymerization of the resin proceeds more rapidly than does the removal of the solvent from the inner layers of the enamel. This results in a cured "skin" of enamel being formed on the outside of the coating, trapping the solvents remaining in the enamel. As soon as such entrapped solvents reach a temperature above their boiling point in the subsequent curing of the enamel, the accompanying vaporization of the solvent will produce a bubble in the enamel coating which may break, again causing the enamel coating to have poor dielectric strength so that it is generally unacceptable for electrical applications.

Further, insofar as the rate of evaporation is concerned, it is desirable to heat the resin-solvent mixture to the highest temperature possible so as to remove the solvent in the shortest period of time, as by the simultaneous heating of the coated wire by radiant and convection heat immediately upon its entry into the oven, as disclosed and claimed in copending application, Serial No. 80,855, filed on January 5, 1961, now abandoned, entitled "Process for Heat Treating Coated Metals," based on an invention of John D. Stauffer and assigned to the same assignee as this application. This can be accomplished by causing pre-heated gas to flow past the uncured enamel on the wire at the highest relative velocity possible, since the rate of solvent evaporation from the surface of the enamel is thus maximized and the fume concentration of the solvents in the oven gas is reduced so as to minimize the risk of ignition. However, if the gas temperature is at a level which for the specific enamel involved will result in a rapid polymerization of the surface layer of enamel, the surface layer will become relatively impervious to the solvent and will entrap the solvent remaining in the underlying layers of the enamel with the result that the enamel will blister. Moreover, while a high velocity is desirable for reducing the fume concentration in the oven and for increasing the rate of heating the enamel coating by convection, a high velocity may cause a turbulence of the gas and vibrate the wire. This will distort the film coating, causing a non-uniform film thickness. Thus the velocity and direction of the gas flow must be closely controlled, particularly at the point where the wire enters the oven. This invention provides apparatus for overcoming these problems.

The term "gas," as used herein, denotes generally a mixture of one or more gasses and also includes air, vapors and fluidized products of combustion.

The features of novelty which characterize this invention are pointed out with particularity in the claims annexed to and forming part of this specification. For a better understanding of the invention, however, its advantages and the specific objectives attained with its use, reference should be made to the accompanying drawing and description in which particular embodiments of the invention are described.

Briefly stated, in accordance with one aspect of this invention, there is provided a wire enameling oven having a treating chamber comprising a solvent removal zone and a curing zone. Heated gas is circulated independently through each of these zones from air inlet ports adjacent the inlet and exit of the treating chamber of the oven toward a common gas discharge opening positioned between the curing zone and the solvent removal zone. The temperature and velocity of the circulating gas in the curing zone is greater than the temperature and the velocity of the gas in the solvent removal zone. The gas inlet ports are provided with gas directors to cause the circulating gas to flow with minimum turbulence and parallel to the path of the wire being treated. A radiant heating panel is provided in the solvent removal zone to assist in the heating to the enamel to a predetermined temperature as rapidly as possible. The panel is positioned at an angle with respect to the path of the wire so as to increase the velocity of the gas as the amount of solvent in the coating decreases. A pressure box is provided at the exit of the treating chamber to prevent the escape of gas and fumes from the treating chamber.

Figure 1:
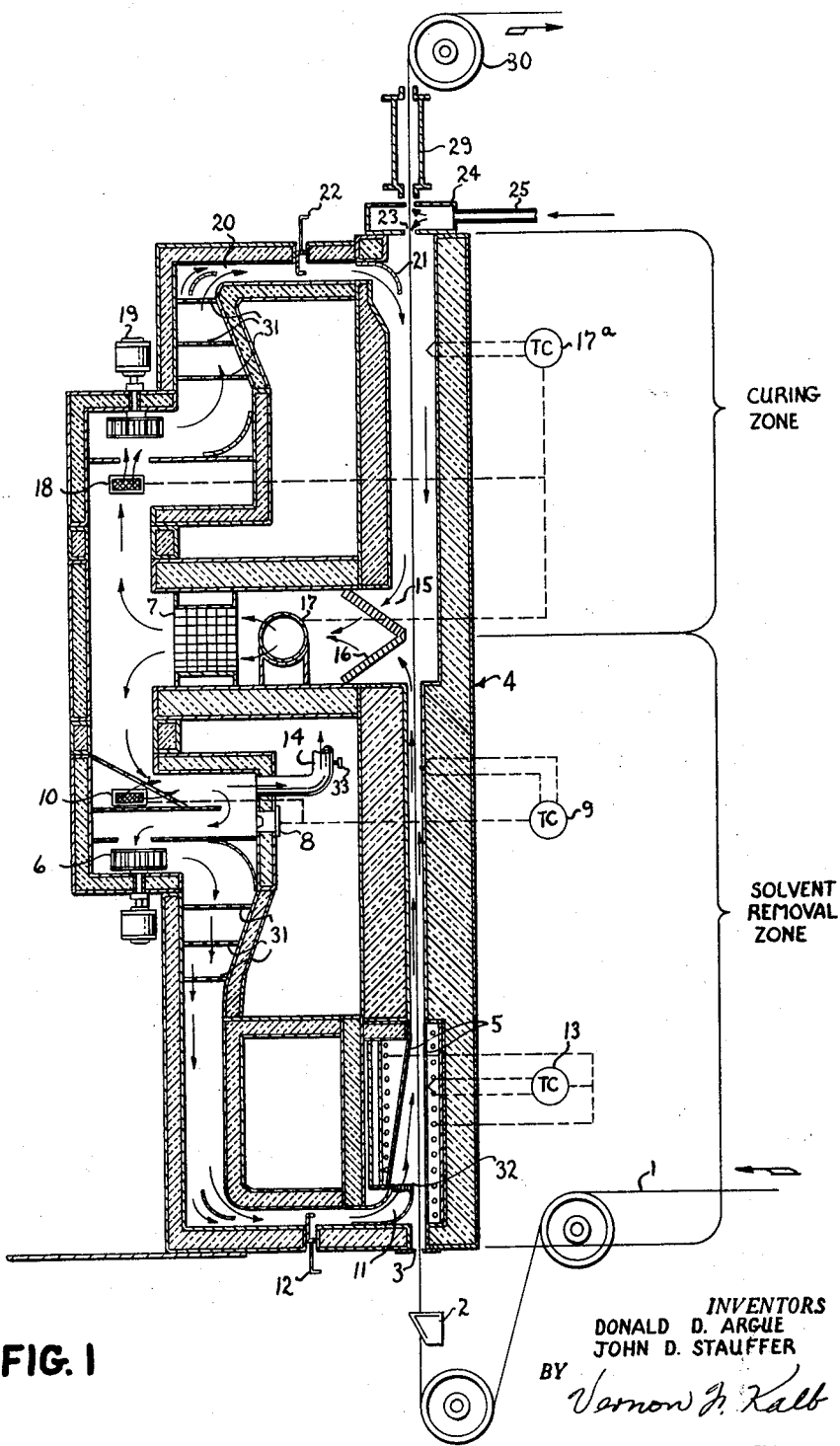
FIG. 1 is a sectional view of an enameling furnace incorporating this invention.

Referring now specifically to the drawing, there is shown in FIG. 1 a wire enameling furnace made in accordance with this invention. Bare copper wire 1 is passed through an enamel applicator 2 where a coating of resin and solvent in liquid form is applied. It then passes through an opening 3 in the bottom of the furnace oven 4 where it immediately is subjected to radiant heat produced by radiant heating panels 5, which, as shown, are disposed on both sides of the wire. A fan 6 produces a flow of gas in the solvent removal zone having a path as indicated by the arrows shown on the drawing. This gas may be heated by the catalytic burner 7 which burns the vapors released during the process. A separate burner 8 is also furnished to provide additional heat to the gas delivered by fan 6, if required. The temperature of the gas being circulated through the solvent removal zone may be regulated in any suitable manner; for example, thermocouple 9, which is shown as being positioned adjacent the point of exit of wire 1 from the solvent removal zone, may provide a signal to regulate the output of heat from burner 8 to increase the temperature of the gas or to automatically control the admission of cool air through vent 10 to lower its temperature. A discharge port 14, which may be controlled by a flow control damper 33, is provided for the discharge of an amount of excess gas equal to the amount of cool air admitted through vent 10. Pressure panels or distribution plates 31 are provided to mix the hot and cool air and to cause the air velocity of the flowing column of gas in conduit 11 to be substantially uniform throughout. It will be apparent that the gas conduit 11 communicates with the solvent removal zone of the oven adjacent to the inlet 3 to assist in heating the wire enamel immediately upon the entry of wire 1 into the oven 4. It will also be apparent that thermocouple 9 can control the temperature of the wire enamel at the desired level after it passes beyond the point where it is subjected to radiant heat produced by radiant panels 5.

As shown in FIG. 1, there is provided a combination of heating means which heat the enamel simultaneously and rapidly to the highest permissible temperature for the solvent removal process immediately upon its entry into the oven and to maintain the temperature of the enamel at the desired level without overheating. As shown, radiant heating panels 5, positioned on opposing walls of the treating chamber, in addition to the preheated recirculating gas from conduit 11, apply heat to the wire 1 immediately upon its entry into the oven. The radiant heat panels 5 may have a temperature of the order of 1100° F.–1200° F., which is about four times the desired ultimate temperature of the enamel during the solvent removal process without causing a premature curing of the surface layer of the enamel. The source of heat for radiant heat panels 5 may be either gas burners or electrical heating elements, or any other suitable heat source, and the temperature level of these panels may be controlled independently of the temperature of the recirculating air from conduit 11 by any conventional regulator based on a signal developed by thermocouple 13. The use of radiant heat offers the further advantage of heating the enamel coating in depth, thereby reducing the temperature gradient in the coating to the order of 20° F. or less. Since the liquid diffusivity of the solvent (i.e., its ability to migrate to the surface of the enamel) rises with increase in temperature, it is apparent that a minimum temperature gradient will aid in the removal of the solvent.

The temperature of the heated gas utilized during the solvent removal process is determined by the maximum temperature at which the particular enamel utilized will not polymerize so rapidly as to produce a skin to entrap solvent in underlying layers. When the gas temperature is at the desired level, it will limit the temperature of the enamel to a value just under the temperature at which the enamel will blister while assuring the maximum rate of solvent removal, even after the wire is no longer subject to the influence of radiant heat.

It will be apparent that the blister temperature will vary according to the particular enamel used and this can easily be determined for any particular enamel. By way of illustration, if polyvinyl formal resin, as disclosed and claimed in U.S. Patent 2,307,588—Jackson et al., and Reissue Patent 20,430—Morrison et al., and is frequently used for film-coated wire (known to the trade by the registered trademark "Formex") is used, the blister temperature of the enamel during the solvent removal process is about 310° F.

The maximum gas temperature which may be utilized in the solvent removal zone to achieve the maximum rate of solvent removal without exceeding the blister temperature for the enamel involved will also vary in accordance with the gas velocity, the wire speed, the wire size, the thickness of film applied during each pass through the furnace, and the amount of radiant heat applied to the enamel wire. By way of illustration, for Formex wire in which an enamel coating having a final film thickness of 5 mils per pass is applied to a 40.3 mil round copper strand (No. 18 A.W.G.), moving through the enameling oven at a speed of 86 feet per minute while being subjected to convection heating from gas having a velocity of 500 feet per minute and with approximately 55% of the total heat applied to the coated wire being generated by the radiant heating panel, the gas temperature may be on the order of 550° F. without any blistering of the wire enamel.

Since the percentage of heat which may efficiently be applied by the radiant panels will vary in accordance with different conditions, such as the wire size, it is important that the heat applied by radiation and by convection be independently variable. As indicated above, this invention provides separate controls for the radiant and convection heat sources in the solvent removal zone to accomplish this purpose.

As an indication of the criticality of the maximum temperature of the surface layer of the enamel coating, the relative curing rates of the enamel used on Formex wire is as follows:

| Temperature, °F.: | Curing time, minutes |
|---|---|
| 310 | 60 |
| 390 | 2.75 |
| 460 | 0.10 |

It is therefore apparent that the blister temperature for any given enamel can be determined and should not be exceeded in the solvent removal process.

As indicated above, it is essential that the heat applied to the enamel during the solvent removal process be both the result of radiant heating from a source having a temperature substantially higher than the blister temperature of the wire and the convection heating produced by a heated stream of gas which will heat the enamel to a temperature just below the blister temperature for the particular enamel involved and the boiling point of the solvent or solvent mixture remaining in the enamel at any point in the solvent removal zone if such boiling point is lower than the blister temperature.

It is also desirable that a relatively high gas velocity be utilized. If the gas stream is caused to flow parallel to the axis of the wire with its coating of uncured enamel, the relative gas velocity measured with respect to the wire may be as much as about 700 ft. per minute without producing turbulence which will deform the coating on the wire. While this gas velocity level can be achieved under laboratory conditions without causing turbulence, in practice the relative gas velocity should not exceed about 500 ft. per minute to accommodate variations found in production equipment and processes. This level assures a high rate of heating of the enamel coating by convection without causing a turbulence or vibration which will deform the film.

As will be understood, the uncured enamel immediately upon entering the treating chamber will have a low viscosity. Thus any lateral or vibratory forces imparted to the wire at this point are particularly undesirable. In accordance with an important aspect of this invention, a gas directing means is provided to cause the gas entering from gas conduit 11 to flow in a direction parallel to and in the direction of the path of wire 1 through the treating chamber. As shown, this gas directing means is in the form of a curved or involute end on gas conduit 11, terminating with a gas straightening grid 32, to minimize any lateral components of gas flow against the wire. This construction also aids in preventing any gas from flowing out of the bottom of the treating chamber through opening 3.

A control valve 12 is provided to regulate the gas flow to any desired velocity. While this valve is shown as being manually controlled, it is apparent that it could also be controlled automatically by any conventional means.

In accordance with another important aspect of this invention, means are provided for increasing the flow of gas in the solvent removal zone after the initial solvent has been removed and the viscosity of the film is higher. As shown, one of the radiant heating panels is positioned at an angle, or tapered, with respect to the path of the wire in the treating chamber. This gradually reduces the cross-section of the treating chamber so as to automatically increase the velocity of the gas as some of the solvent is removed.

In addition, means are provided for maintaining or increasing the velocity of the circulating gas in the solvent removal zone downstream from the radiant heating panels by providing a cross-sectional area for the treating chamber at this point so as to at least maintain the gas velocity through the remainder of the solvent removal zone. If desired, the cross-sectional area of this portion of the treating chamber can be tapered to further increase the gas velocity at the end of the solvent removal zone.

After the circulating gas passes from the solvent removal zone, it is laden with solvent fumes and enters exhaust opening 15, which is provided with a mixing device 16, where it is mixed with the gas being discharged from the curing zone. This mixing will insure that the temperature and fume concentration in the gas passing through the catalytic burner is uniform.

The catalytic burner 7 will raise the temperature of the gases sufficiently high to incinerate the fumes and, if necessary, an additional heat source 17 may be provided for any additional heat required. Additional heat source 17 may be controlled by any conventional regulator based on a signal developed by thermocouple 17a.

Upon leaving catalytic burner 7, the gas divides and a portion of it passes through the conduit 11 to be recirculated through the solvent removal zone. As indicated above, this relatively high temperature gas may be mixed with fresh air entering duct 10 so as to provide the proper gas temperature for the solvent removal zone and to maintain the concentration of solvents within acceptable limits.

The remainder of the gas is directed upwardly to be recirculated through the curing zone. This high temperature gas is mixed, if necessary, with fresh air entering at port 18, which may be controlled in any conventional manner in response to a signal from thermocouple 17a, and circulated by fans 19 through duct 20 into the curing zone, as indicated by the arrows. Gas directing means shown in the form of a curved louver 21 is provided to direct the gas flow in a direction parallel to the path of the wire. A gas flow control valve 22 is provided to regulate the air velocity in the curing zone. Because the enamel is highly viscous as the curing process is being completed, the gas velocity in the curing zone is preferably substantially higher than that of the solvent removal zone. It has been found that gas velocities of the order of 850 ft. per minute may be utilized without deforming the enamel and without causing the wire to vibrate. As indicated previously, the temperature of the gas circulated through the curing zone may also be higher than that circulated through the solvent removal zone since substantially all the solvent is removed from the enamel coating before it enters the curing zone. For Formex wire, gas temperatures may be of the order of 200° F. higher than in the solvent removal zone, or 750° F., under the operating conditions referred to above for No. 18 A.W.G. wire.

Since the wire passing through the treating chamber serves as a gas pump which will tend to cause some of the fume-laden gas to escape through treating chamber exit 23, there is provided a pressure box 24 which is connected to a source of pressurized air, not shown, through a conduit 25 for maintaining the pressure in the pressure box 24 at a higher level than that of the gas within the upper portion of the treating chamber. Any flow of air through the chamber exit 23 will be downward into oven 4.

Figure 2:
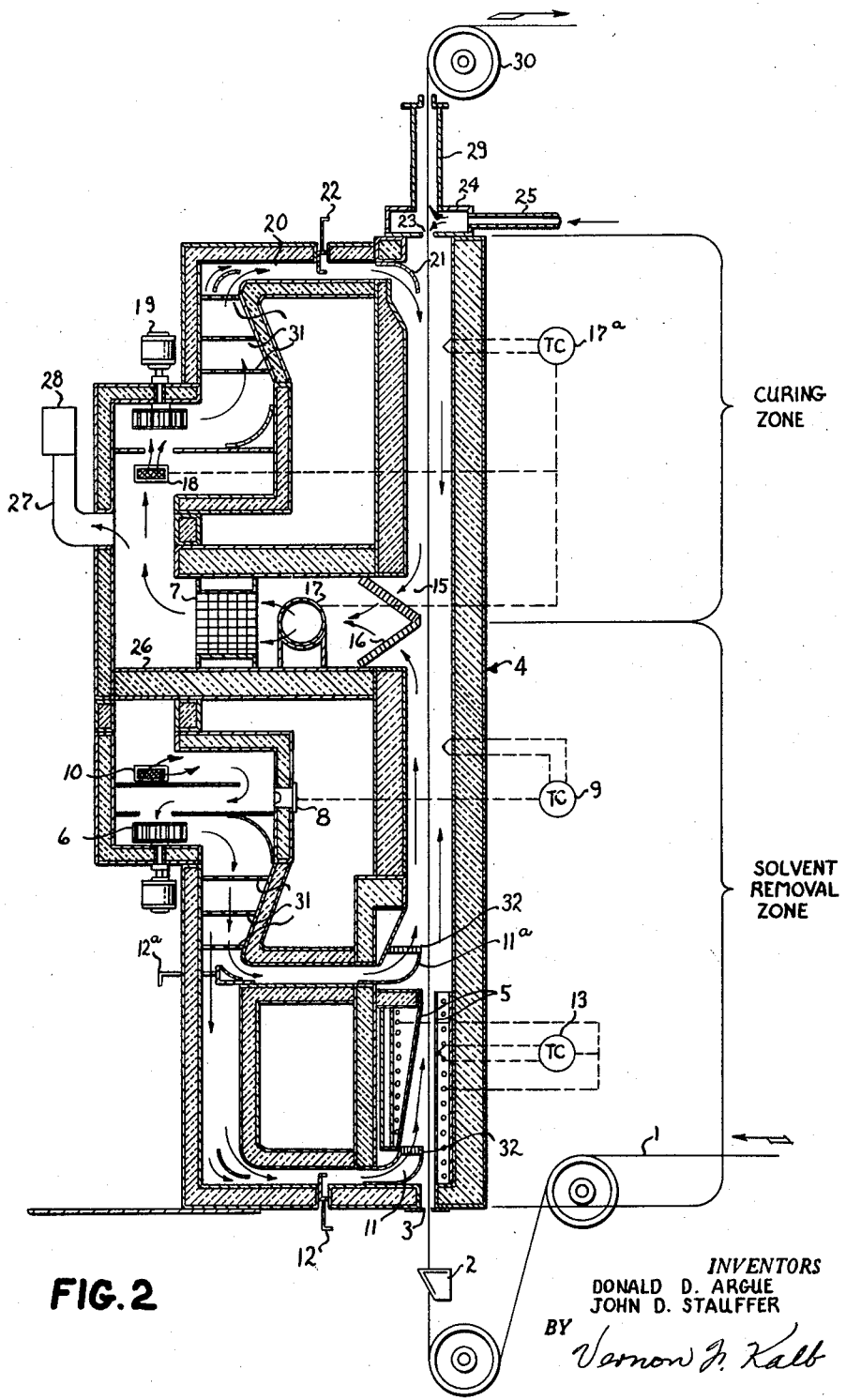
FIG. 2 is a sectional view of an enameling furnace incorporating modifications of this invention.

Turning now specifically to FIG. 2 in which like numerals refer to like parts, there is shown another form of apparatus incorporating this invention. In this form of the invention it will be observed that a second gas inlet duct 11a is provided to increase the gas flow in the upper portion of the solvent removal zone after some of the solvent has been removed and the enamel film is more viscous. As indicated, a flow control valve 12a is provided to adjust the relative flow of gas between conduits 11 and 11a. Also a curved or involute gas directing means, terminating with a gas straightening grid 32, is provided at the outlet of conduit 11a to cause the gas to flow in a direction parallel to the path of the wire. By this means it will be apparent that the velocity of the air flow in the upper portion of the solvent removal zone may be adjusted to any desired level and this feature is particularly advantageous in minimizing the fume concentration in the solvent removal zone so as to minimize the combustion hazard which might otherwise be present. In another modification of the invention, as shown in FIG. 2, the gas is not recirculated through the solvent removal zone which is isolated from the gas recirculating through the curing zone by wall 26, and only fresh air entering through port 10 and heated by burner 8 passes through the solvent removal zone. This construction offers the advantage of increased safety in operation in that the gas in the furnace always contains adequate oxygen under all operating conditions to insure the combustion of the solvent in catalytic burner 7.

In the apparatus of FIG. 2, the heated gas from the catalytic burner is circulated through the curing zone with the excess being discharged through port 27, which may be connected to a blower 28 which is controlled in any conventional manner to maintain the pressure and temperature within the curing zone at desired values.

Another modification illustrated in FIG. 2 is the combination of pressure box 24 and wire cooler 29 to utilize a single source of cooling air for sealing the treating chamber and for cooling the wire before it engages top sheaves 30 prior to being stored on spools or recycled through the oven for additional layers of enamel.

Figure 3:
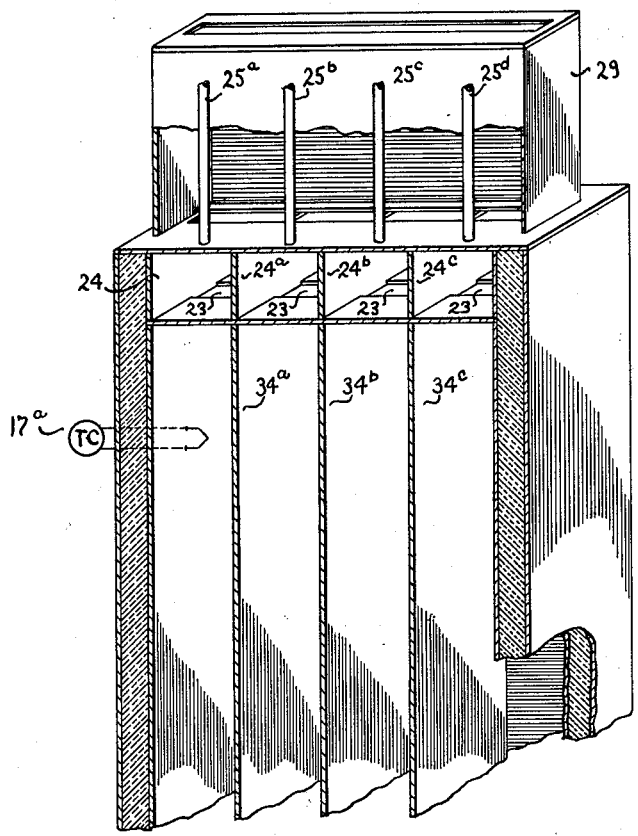
FIG. 3 is a partial perspective view of another modification of the curing zone portion of the apparatus of this invention.

FIG. 3 illustrates another modification of the apparatus shown in FIGS. 1 and 2 in which the pressure box 24 is divided into a plurality of tranverse sections by divider plates 24a, 24b and 24c, and the top or curing zone of the oven is divided into a plurality of separate air tight channels by laterally spaced divider plates 34a, 34b and 34c. It will be apparent that by controlling the temperature of the air in, say the channel to the left of the divider plate 34a through the use of thermocouple 17a, as hereinbefore described, the temperature and the air velocity in each of the other channels of the curing zone may be varied with respect to the temperature and air velocity to the left of divider plate 34a by adjusting the pressure and/or the temperature of the air from each of the air supply conduits 25a–25d. It will be apparent that by this means the amount of air entering the several air tight channels of the curing zone may be varied from the minimum required to prevent the outward flow of gas from the curing zone to any greater value desired. The modification of FIG. 3 will provide additional flexibility to the oven and will allow the application of more than one type of enamel at the same time or the application of layers of film of enamel of varying thicknesses on a wire passed though the oven. It will also allow the processing of a wider range of wire sizes with the same enamel.

From the foregoing, further modifications will occur to those skilled in the art. It should be understood, therefore, that the appended claims are intended to cover all such modifications which do not depart from the spirit or scope of this invention.

What we claim as new and desire to secure by Letters Patent of the United States is:

1. A recirculating oven comprising a housing, means in the housing providing an elongated treating chamber for guiding the flow of gas and for receiving coated metal passing therethrough, an entrance opening at one end of said chamber for the entry of said coated metal, an exit opening at the other end of said chamber for the discharge of said coated metal, said treating chamber comprising a solvent removal zone and a curing zone, said treating chamber including a first gas inlet opening near the entrance opening and including also a second gas inlet opening near the exit opening, a first gas circulating means communicating with said first gas inlet opening and causing gas to flow through said solvent removal zone concurrently with the movement of the coated material, a second gas circulating means communicating with said second gas inlet opening and causing gas to flow through said curing zone in an opposing direction, means for mixing the gasses from said curing zone and solvent removal zone, heater means for heating the gasses from said mixing means and discharging said gasses into at least the inlet of said second gas circulating means, radiant heating means positioned in the solvent removal zone adjacent the gas inlet opening of the treating chamber, a first means for controlling the temperature of the gas flowing in the solvent removal zone within predetermined limits, a second means for controlling the temperature of the gas flowing in the curing zone within predetermined limits, said gas passing through the curing zone being maintained at a higher temperature than the gas flowing through the solvent removal zone, means for controlling the quantity of gas supplied to said first gas inlet opening, and means for controlling the quantity of gas supplied to said second gas opening.

2. Apparatus as set forth in claim 1 wherein each of said gas inlet openings includes gas directing means for causing the gas to flow in a direction substantially parallel to the path of the coated metal being treated.

3. Apparatus as set forth in claim 1 wherein means are provided for controlling the temperature of the radiant heating means, said temperature of the radiant heating means being controlled gas flowing through said solvent removal zone.

4. Apparatus as set forth in claim 1 wherein the radiant heating means includes a heating panel positioned at an angle with respect to the path of the coated metal so as to increase the velocity of the gas circulating in the solvent removal zone as it progresses in a direction away from the entrance opening of the treating chamber.

5. Apparatus as set forth in claim 1 wherein the solvent removal zone of the treating chamber includes a portion having a uniform cross-sectional area to maintain a substantially constant velocity of gas flowing therein.

6. A recirculating oven comprising a housing, means in the housing providing a vertically disposed treating chamber for receiving coated metal passing therethrough, an entrance opening at the bottom of said chamber for the entry of said coated metal, an exit opening at the top of said chamber for the discharge of said coated metal, said treating chamber also including a first gas inlet opening near said entrance opening and a second gas inlet opening near said exit opening, said treating chamber comprising a solvent removal zone and a curing zone, a first gas circulating means communicating with said first gas inlet opening for causing gas to be supplied to said first gas inlet opening, a second gas circulating means communicating with said second gas inlet opening for supplying gas thereto, said treating chamber being provided with a gas discharge opening positioned between said zones for the flow of gas therefrom, heater means for heating the gas prior to its entry into at least one of said gas circulating means, radiant heating means positioned in the solvent removal zone adjacent said first gas inlet opening of the treating chamber, a first means for controlling the temperature of the gas flowing in the solvent removal zone, a second means for controlling the temperature of the gas flowing in the curing zone, means for controlling the flow of gas to said first gas inlet opening, means for controlling the flow of gas to said second gas inlet opening, and a pressure box positioned in communication with the exit opening at the top of said treating chamber for providing a pressure within said pressure box greater than the pressure in the top portion of the treating chamber to prevent the escape of gas from the treating chamber.

7. Apparatus as set forth in claim 6, including a cooler positioned above said pressure box and communicating with said pressure box thereby permitting gas to pass from said pressure box to said cooler.

References Cited by the Examiner

UNITED STATES PATENTS

| | | | |
|---|---|---|---|
| 890,314 | 6/08 | Thompson. | |
| 1,472,741 | 10/23 | Ayres | 34—155 X |
| 1,586,897 | 6/26 | Harris | 34—62 X |
| 1,722,797 | 7/29 | Jessup | 34—18 |
| 1,890,065 | 12/32 | Meehan | 263—3 |
| 1,947,548 | 2/34 | Fruth et al. | 262—3 |
| 2,107,275 | 2/38 | Anderson | 34—23 |
| 2,225,505 | 12/40 | Offen | 34—31 X |
| 2,391,195 | 12/45 | Ross | 34—48 X |
| 2,445,443 | 7/48 | Long | 34—60 |
| 2,534,973 | 12/50 | Ipsen et al. | 266—3 |
| 2,695,252 | 11/54 | Nickelsen | 34—156 X |
| 2,726,458 | 12/55 | Vaughan | 34—223 X |
| 2,731,732 | 1/56 | Harris et al. | 34—160 X |
| 2,890,878 | 6/59 | Steinherz et al. | 263—3 |
| 2,921,778 | 1/60 | Rulf | 266—3 |

NORMAN YUDKOFF, *Primary Examiner.*